United States Patent Office 2,842,521
Patented July 8, 1958

2,842,521

ALKOXY ALKYL SILOXANE AND A BORIC ACID HYDROXY COMPOUND MIXTURE

Siegfried Nitzsche and Manfred H. Wick, Burghausen, Upper Bavaria, Germany, assignors to Wacker-Chemie G. m. b. H., Munich, Bavaria, Germany No Drawing. Application December 2, 1954
Serial No. 472,776

Claims priority, application Germany December 5, 1953

7 Claims. (Cl. 260—46.5)

This invention relates to methods of accelerating the curing rate of organosiloxane resins, and to novel compositions embodying such a method.

The need for curing agents or catalysts for "silicone" resins has been well recognized in the past, and many such agents have been advocated and used. There is a continual need for new and better curing agents, however, in order to further reduce the time and/or temperature necessary to "set" the silicone resins, or to improve the properties of the resulting products.

The use of various catalysts and dehydrating agents during the preparation of the resins has also been advocated as a means for obtaining improved products. The methods employed hitherto, however, have not always been satisfactory. It has usually been necessary to use polymers of relatively high aryl substitution (e. g. more than 50 mol percent of the total organic substitution) to obtain air-drying silicone resins which had transient thermoplastic properties and which could be cured to the thermoset state at 150° C. or below in a reasonable length of time. Such resins are more difficult and expensive to prepare than the resins of higher alkyl, particularly methyl, content.

On the other hand, the use of higher curing temperatures or times is not only expensive but is often impossible, e. g. when heat-sensitive materials such as paper or textiles are to be coated or impregnated with the resin.

It is an object of this invention to provide a method for producing an accelerated curing rate in organopolysiloxane resins. A further object is to provide air-drying, transiently thermoplastic organosiloxane resins containing relatively smaller amounts of arylsiloxane polymeric units which can be cured or set at comparatively low temperatures. Other objects and advantages will be apparent from the following description.

The present invention provides a method for the preparation of resinous organopolysiloxanes having accelerated curing properties which comprises mixing a resinous partially condensed organopolysiloxane in which at least 50 mol percent of the organic radicals attached directly to silicon are alkyl radicals and in which at least some of the silicon atoms have alkoxy groups attached thereto, with a complex formed from the reaction of boric acid and an hydroxy compound selected from the group consisting of water, liquid mono- and polyhydric alcohols, and liquid phenols, and heating the mixture.

The use of boric acid, boric acid anhydride, and organic boric acid esters as catalysts for silicone resins has been suggested in the literature. Such materials do have some beneficial qualities, but do not have nearly as much effect as the above defined complexes.

Organopolysiloxane resins of the type employed herein are well known materials. For the purposes of this invention at least 50 mol percent, and preferably 90–100 mol percent, of the total organic groups attached directly to silicon are alkyl groups such as methyl, ethyl, propyl, octadecyl, etc. Any remaining groups are preferably monocyclic aryl, such as phenyl.

As is known, these resins contain polymeric units of the formula

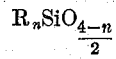

where R is the appropriate organic radical or radicals. In the units themselves, $n$ can be 0 to 3 inclusive. The average value of $n$ for all of the units present, however, is usually from about 1 to about 1.7 in the resinous products in question. A preferred range of values for $n$, in the transiently thermoplastic resins herein, is from 1.1 to 1.5.

As has been stated above, the resins used in this invention are partially condensed. In other words there are still some uncondensed hydroxy radicals attached to silicon. As the degree of condensation is advanced, such resins finally become insoluble in organic solvents and reach an infusible state. It is also necessary that the siloxanes have some alkoxy groups attached to the silicon atoms. The amounts are not critical, for the effect of the catalysts are obtained as long as alkoxy is present in any amount. The best practical products are obtained, however, when the alkoxy groups are present in an amount of from 0.5 to 10 mol percent (of the silicon present).

Various methods for preparing these alkoxylated organopolysiloxanes have been described in the literature. In general, an appropriate organohalosilane is reacted with an alcohol, and the resulting "ester" is partially hydrolyzed. The nature of the alkoxy group is not critical to the invention, but for practical purposes the lower alkoxy radicals (e. g. 1 to 8 carbon atoms) are preferred.

The boric acid complexes are prepared by reacting boric acid with water, with liquid mono- or polyhydric alcohols, or with phenols. The reaction to form these complexes is usually brought about by merely mixing the reactants to form a paste thereof. The amounts of boric acid and hydroxy compound employed to form the complex are not critical, for an excess of either ingredient does no particular harm to the resin mixture.

There is no limit on the molecular weight of the alcohols or phenols employed to form the complex, except that they should be liquid at ordinary temperatures. Suitable compounds are, e. g., methanol, ethanol, propanol, butanol, glycerine, ethylene glycol, propylene glycol, phenol, cresol, etc. The lower boiling hydroxy compounds are preferred, because they are more readily volatilized from the resin during its cure.

The exact nature and structure of all of the complexes is not completelly understood. It is known that the acidity of the boric acid is considerably increased by the complex formation, and structures such as the following have been proposed: $[B(OH)_4]H$, $[B(OH)_3OCH_3]H$,

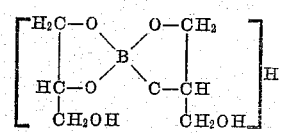

The boric acid-water complex does not necessarily have to be prepared from liquid water, for storage under very humid conditions can produce some of the hydrate shown in the first formula above. [See Lesqueur, Ann. Chim. Phys. [6], 19, 45 (1890) and P. H. Hermans, Z. Anorg. Ch. 142, 83–110, 399–400, (1925).]

The boric acid complex has a catalytic effect on the alkoxylated organopolysiloxanes no matter how little or how great the amount employed. Best results are obtained, however, by using from 0.1 to 5 percent by weight, based on the weight of the resin. If desired, the catalyst can be mixed with the resin, and the resin then stored until needed for its ultimate use. The condensation temperature used for the resin-catalyst mixture generally lies in the region of 50–250° C., temperatures of 100–150° C. being preferred.

A particularly preferred method of operation is to adjust the amount of boric acid complex to the alkoxy content of the siloxane to be condensed. During the course of the condensation, the complex reacts with the alkoxy radical of the siloxane to form the corresponding boric acid ester, which can be volatilized if the low boiling derivatives have been employed. Thus by using appropriate quantities (1 equivalent boric acid to 3 equivalents of alkoxy) one can obtain a resin which is free of catalyst, which in many cases is highly advantageous.

Although a boric acid ester seems to be formed when using most of the catalysts according to this invention, the effect on the curing rate of the resin is entirely different than when the ester is employed initially. Neither boric acid nor its esters provide the air-drying, rapidly curing resins produced by this invention.

A particularly advantageous use for this invention is in the preparation of transiently thermoplastic products, e. g. molding compounds. The property of transient thermoplasticity refers to the ability of the resin, which is tack-free and friable or pelletable at ordinary temperatures, to soften or melt so that it can flow at elevated temperatures, but to become insoluble and infusible when held at the elevated temperature. Thus the defined resins and catalysts can be heated until the condensation progresses to the point where a tack-free product is provided at ordinary temperatures, but short of the point at which an infusible product is obtained. The resulting product can then be used as a molding powder or compound, and requires but a short time in the mold to be completely cured. Of course the products of this invention are also useful as coating, impregnating, and laminating resins, and possess the desirable properties for which the silicone resins are now renowned.

The resins prepared by this invention can be used as solutions in any of the organic solvents conventionally employed with silicone resins, e. g. toluene, xylene, benzene, petroleum ethers, VM and P naphtha, etc. Conventional additives can also be employed, e. g. pigments, fillers, other catalysts, etc.

The following examples are ilustrative only.

EXAMPLE 1

A mixture of 90 g. $MeSiCl_3$ and 15 g. $Me_2SiCl_2$ is added dropwise with good stirring to 80 g. ethanol. The resultant product is then slowly reacted with 15 g. $H_2O$ whereby saponification takes place. After 5–10 minutes, 100 cc. toluene is added and then an excess of water in order to halt the hydrolysis. The HCl is washed out with water and the toluene distilled off. The residual highly viscous alkoxy siloxane is mixed with 0.5 g. boric acid, which had been mixed with 1 cc. methanol, and stirred and heated to 150° until the desired viscosity is attained. Finally the resin is taken up in cyclohexanone and filtered.

The resultant silicone resin is completely tack-free at temperatures below 120° and at temperatures between 120° and 200°, it is thermoplastic for a short time so that it is very suitable for the production of moldings. At 150° it loses its thermoplasticity in 5–10 minutes.

EXAMPLE 2

By cohydrolyzing monemethyltrichlorosilane and dimethyldichlorosilane according to U. S. Patent 2,647,880 a resin was prepared which contained 80 mol percent monomethyl, 17 mol percent dimethyl and 3 mol percent ethoxy groups. After substantially distilling off the solvent, 1 part of this resin was further condensed at 120° C. with 1.5 percent dry boric acid (resin $a$), 1 part with 1.5 percent $H[B(OH)_4]$ (resin $b$) and a third part with boric acid moistened with glycerin (resin $c$). In the following table the properties of the resins obtained are shown.

| Resin | a | b | c |
|---|---|---|---|
| Period of condensation until the melting point reaches 120°. | 150 min | 30 min | 20 min. |
| Properties of film after evaporation of the solvent. | tacky | air-dried | air-dried. |
| Baking period at 150° until the resin is tack-free at this temperature. | 80 min | 20 min | 20 min. |
| Hardness of film after baking (pencil hardness). | 3 to 4 H | 5 to 6 H | 6 H. |
| Flow of resin when molding impregnated glass-cloth (50% glass, 50% resin) ECC 116 or No. 181, after pre-curing 10 minutes at 150° C., at a molding pressure of 284.5 p. s. i. and a molding temperature of 155° C. | 40% | 12% | 8%. |

EXAMPLE 3

By cohydrolyzing phenyltrichlorosilane, phenylmethyldichlorosilane and monomethyltrichlorosilane according to U. S. Patent 2,647,880, a resin was prepared which contained 20 mol percent monophenyl, 60 mol percent monomethyl, 15 mol percent phenylmethyl and 5 mol percent ethoxy groups. The resin which was substantially free of solvent was condensed at 135° C. with 2 percent boric acid impasted with gylcol, until a 50 percent solution in toluene had a viscosity of 50 cs. The resin thus prepared was dust-dry and cured in 10 minutes at 160°, whereas another resin of the same composition, but which had been prepared by condensing with dry boric acid, was still tacky after evaporation of the solvent and took one hour at 160° C. to cure.

If the same resin is condensed with boric acid esters or boron halides, the curing periods are even longer than by using dry boric acid.

EXAMPLE 4

A solvent-free resin of the same composition as that of Example 3 was reacted with 5 percent boric acid and 2 percent phenol. Subsequently the resin was condensed for 20 minutes at 130° C. while it was strongly agitated. A 60 percent toluene solution of the resin had a viscosity of 120 cs. The lacquer film was tack-free after the evaporation of the solvent, and the resin could be baked within 60 seconds at 250° C., whereby an infusible film was obtained.

Without the addition of phenol, the resin was very tacky after the evaporation of the solvent and an infusible film was obtained only after 30 minutes at 250° C.

That which is claimed is:

1. A composition of matter consisting essentially of a mixture of (1) a partially condensed resinous organopolysiloxane in which at least 50 mol percent of the organic radicals attached directly to silicon are alkyl radicals and in which at least 0.5 mol percent of the silicon atoms have alkoxy groups attached thereto, and (2) a mixture of boric acid and an hydroxy compound selected from the group consisting of water, liquid mono- and polyhydric alcohols, and liquid phenols.

2. The composition of claim 1 wherein the organopolysiloxane contains from 0.5 to 10 mol percent alkoxy groups attached to silicon and the mixture of boric acid and hydroxy compound is present in an amount of from 0.1 to 5 percent by weight based on the weight of the organopolysiloxane.

3. The composition of claim 2 wherein the organopolysiloxane is a copolymer of monomethyl- and dimethylsiloxane units, said copolymer having an average $CH_3/Si$ ratio of from 1.1 to 1.5.

4. A method for the preparation of resinous organopolysiloxanes having accelerated curing properties which comprises mixing a resinous partially condensed organopolysiloxane in which at least 50 mol percent of the organic radicals attached directly to silicon are alkyl radicals and in which at least 0.5 mol percent of the silicon atoms have alkoxy groups attached thereto, with a mixture of boric acid and an hydroxy compound selected from the group consisting of water, liquid mono- and polyhydric alcohols, and liquid phenols, and heating the mixture at 50° to 250° C.

5. A method for the preparation of an air-drying resinous organopolysiloxane having transient thermoplastic properties which comprises mixing a resinous partially condensed organopolysiloxane in which at least 50 mol percent of the organic radicals attached directly to silicon are alkyl radicals, any remaining radicals being aryl radicals, at least 0.5 mol percent of the silicon atoms therein having alkoxy groups attached thereto and the average degree of substitution of said organopolysiloxane ranging from 1.1 to 1.5 organic groups attached directly to silicon per silicon atom, with a mixture of boric acid and an hydroxy compound selected from the group consisting of water, liquid mono- and polyhydric alcohols, and liquid phenols, and heating the mixture at 50° to 250° C. for a period of time sufficient to produce a resinous product which is tack-free in the solvent-free state but insufficient to produce the infusible insoluble state.

6. A method for the preparation of an air-drying resinous organopolysiloxane having transient thermoplastic properties which comprises mixing a resinous partially condensed organopolysiloxane in which at least 50 mol percent of the organic radicals attached directly to silicon are alkyl radicals, any remaining radicals being aryl radicals, at least 0.5 mol percent of the silicon atoms therein having alkoxy groups of from 1 to 8 carbon atoms attached thereto and the average degree of substitution of said organopolysiloxane ranging from 1.1 to 1.5 organic groups attached directly to silicon per silicon atom, with a mixture of boric acid and glycerine, and heating the mixture at 50° to 250° C. for a period of time sufficient to produce a resinous product which is tack-free in the solvent-free state but insufficient to produce the infusible insolvent state.

7. A method for the preparation of an air-drying resinous organopolysiloxane having transient thermoplastic properties which comprises mixing a resinous partially condensed organopolysiloxane in which at least 50 mol percent of the organic radicals attached directly to silicon are alkyl radicals, any remaining radicals being aryl radicals, at least 0.5 mol per cent of the silicon atoms therein having alkoxy groups of from 1 to 8 carbon atoms attached thereto and the average degree of substitution of said organopolysiloxane ranging from 1.1 to 1.5 organic groups attached directly to silicon per silicon atom, with a mixture of boric acid and ethylene glycol, and heating the mixture at 50° to 250° C. for a period of time sufficient to produce a resinous product which is tack-free in the solvent-free state but insufficient to produce the infusible insoluble state.

References Cited in the file of this patent

UNITED STATES PATENTS

| 2,371,068 | Rochow | Mar. 6, 1945 |
| 2,584,343 | Goodwin et al. | Feb. 5, 1952 |
| 2,647,880 | Nitzsche | Aug. 4, 1953 |

FOREIGN PATENTS

| 609,324 | Great Britain | Sept. 29, 1948 |

UNITED STATES PATENT OFFICE

Certificate of Correction

Patent No. 2,842,521                                                                 July 8, 1958

Siegfried Nitzsche et al.

It is hereby certified that error appears in the printed specification of the above numbered patent requiring correction and that the said Letters Patent should read as corrected below.

Column 2, lines 57 to 61, the structure should appear as shown below instead of as in the patent—

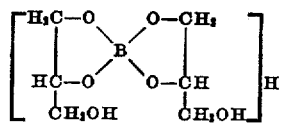

column 3, line 50, for "80 g." read—70 g.—; line 68, for "monemethyltrichlorosilane" read—monomethyltrichlorosilane—; column 6, line 7, for "insolvent" read—insoluble—.

Signed and sealed this 28th day of October 1958.

[SEAL]

Attest:
KARL H. AXLINE,
*Attesting Officer.*

ROBERT C. WATSON,
*Commissioner of Patents.*